US010844813B2

(12) United States Patent
Deb et al.

(10) Patent No.: US 10,844,813 B2
(45) Date of Patent: Nov. 24, 2020

(54) METHOD AND SYSTEMS FOR EXHAUST GAS CONTROL

(71) Applicant: Transportation IP Holdings, LLP, Norwalk, CT (US)

(72) Inventors: Dipankar Deb, Ahmedabad (IN); Manthram Sivasubramaniam, Bangalore (IN); Prashant Srinivasan, Bangalore (IN); Sharath Sridhar Aramanekoppa, Bangalore (IN); Prem Kumar Patchaikani, Bangalore (IN); Sachin Shivajirao Kulkarni, Bangalore (IN); Sebastian Walter Freund, Garching (DE); Jassin Marcel Fritz, Munich (DE); Georgios Bikas, Garching (DE); James Henry Yager, Northville, MI (US); Shashi Kiran, Lawrence Park, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 16/378,407

(22) Filed: Apr. 8, 2019

(65) Prior Publication Data
US 2019/0234352 A1 Aug. 1, 2019

Related U.S. Application Data

(60) Division of application No. 15/045,616, filed on Feb. 17, 2016, now Pat. No. 10,253,731, which is a
(Continued)

(51) Int. Cl.
*F02M 26/49* (2016.01)
*F02D 41/00* (2006.01)
(Continued)

(52) U.S. Cl.
CPC .......... *F02M 26/49* (2016.02); *F02D 41/005* (2013.01); *F02D 41/0082* (2013.01);
(Continued)

(58) Field of Classification Search
CPC ........ F02M 26/38; F02M 26/39; F02M 26/42; F02M 26/43; F02M 26/44; F02M 26/49;
(Continued)

(56) References Cited

U.S. PATENT DOCUMENTS 4,179,892 A 12/1979 Heydrich
4,249,382 A 2/1981 Evans et al.
(Continued)

FOREIGN PATENT DOCUMENTS

DE 102004021371 A1 * 11/2005 ......... F02D 41/0072
EP 1217199 A1 6/2002
(Continued)

OTHER PUBLICATIONS

ISA European Patent Office, International Search Report and Written Opinion Issued in Application No. PCT/US2012/025837, dated Oct. 1, 2012, WIPO, 11 pages.

*Primary Examiner* — John M Zaleskas
(74) *Attorney, Agent, or Firm* — McCoy Russell LLP (57) ABSTRACT

Systems and methods are provided for controlling exhaust gas recirculation (EGR). In one example, an engine system includes a first EGR valve coupling an exhaust manifold to an engine exhaust system, a second EGR valve coupling the exhaust manifold to an engine intake system, and a control unit. The control unit selectively adjusts a position of the first EGR valve based on a target amount, and adjusts a position of the second EGR valve based on the target amount and a position of the first EGR valve. Responsive to a first degradation condition of the first EGR valve, the control unit adjusts the position of the second EGR valve based on the
(Continued)

target amount and based on a pressure of the first exhaust manifold, and responsive to a second degradation condition of the first EGR valve, adjusts the position of the second EGR valve based on the target amount.

13 Claims, 5 Drawing Sheets

Related U.S. Application Data continuation-in-part of application No. 13/039,957, filed on Mar. 3, 2011.

(51) Int. Cl.
- F02D 41/14 (2006.01)
- F02D 41/22 (2006.01)
- F02M 26/43 (2016.01)
- F02M 26/44 (2016.01)
- F02M 26/09 (2016.01)
- F02M 26/47 (2016.01)
- F02M 26/16 (2016.01)
- F02D 41/40 (2006.01)
- F02D 9/04 (2006.01)

(52) U.S. Cl.
CPC ....... F02D 41/1448 (2013.01); F02D 41/221 (2013.01); F02M 26/43 (2016.02); F02D 9/04 (2013.01); F02D 41/0065 (2013.01); F02D 41/40 (2013.01); F02M 26/09 (2016.02); F02M 26/16 (2016.02); F02M 26/44 (2016.02); F02M 26/47 (2016.02); Y02T 10/47 (2013.01)

(58) Field of Classification Search
CPC ............... F02D 41/005; F02D 41/0065; F02D 41/0077; F02D 41/0082; F02D 41/1448; F02D 41/221
USPC .............. 123/568.11, 568.12, 568.16, 568.2, 123/568.21; 60/605.2
See application file for complete search history.

(56) References Cited

U.S. PATENT DOCUMENTS

| | | |
|---|---|---|
| 5,517,976 A | 5/1996 | Bachle et al. |
| 5,711,154 A | 1/1998 | Baechle et al. |
| 6,009,709 A | 1/2000 | Bailey |
| 6,138,649 A | 10/2000 | Khair et al. |
| 6,138,650 A | 10/2000 | Bailey |
| 6,141,959 A | 11/2000 | Digeser et al. |
| 6,286,489 B1 | 9/2001 | Bailey |
| 6,360,732 B1 | 3/2002 | Bailey et al. |
| 6,425,381 B1 | 7/2002 | Rammer |
| 6,457,461 B1 | 10/2002 | Romzek |
| 6,543,230 B1 | 4/2003 | Schmid |
| 6,789,531 B1 | 9/2004 | Remmels |
| 6,877,492 B1 | 4/2005 | Osterwald |
| 7,178,507 B1 | 2/2007 | Gangopadhyay |
| 7,182,050 B2 | 2/2007 | Hitomi et al. |
| 7,287,378 B2 | 10/2007 | Chen et al. |
| 7,447,587 B2 | 11/2008 | Baramov et al. |
| 7,472,696 B2 | 1/2009 | Easley et al. |
| 7,490,466 B2 | 2/2009 | Robel et al. |
| 7,571,608 B2 | 8/2009 | Boyapati et al. |
| 8,297,054 B2 | 10/2012 | Gladden et al. |
| 2003/0182049 A1* | 9/2003 | Bale .................... F02M 26/48 701/108 |
| 2005/0028515 A1* | 2/2005 | Fukuma ................ F01N 3/0842 60/276 |
| 2005/0199229 A1 | 9/2005 | Eitel et al. |
| 2006/0112940 A1 | 6/2006 | Roberts, Jr. et al. |
| 2006/0174621 A1 | 8/2006 | Chen et al. |
| 2007/0130947 A1 | 6/2007 | Baumgard et al. |
| 2007/0175215 A1* | 8/2007 | Rowells .............. F02B 29/0418 60/605.2 |
| 2008/0060624 A1* | 3/2008 | Grandas .............. F02D 41/0065 123/568.12 |
| 2008/0141671 A1* | 6/2008 | Takemoto .............. F02M 26/05 60/605.2 |
| 2008/0216475 A1 | 9/2008 | Kasper et al. |
| 2009/0199825 A1* | 8/2009 | Piper ........................ F02D 9/04 123/568.21 |
| 2009/0223476 A1 | 9/2009 | Shinkai et al. |
| 2009/0308070 A1 | 12/2009 | Alger, II et al. |
| 2010/0024416 A1* | 2/2010 | Gladden .............. F02B 37/001 60/605.2 |
| 2010/0077747 A1* | 4/2010 | Pierpont ............. F02B 37/007 60/605.2 |
| 2010/0179746 A1 | 7/2010 | Caretta et al. |
| 2010/0211292 A1* | 8/2010 | Geyer .................... F02M 26/39 701/108 |
| 2010/0292910 A1* | 11/2010 | Gibble ................ F02D 41/0065 701/103 |
| 2011/0023829 A1* | 2/2011 | Miyashita ........... F02D 41/0087 123/445 |
| 2011/0041495 A1 | 2/2011 | Yager |
| 2011/0107986 A1 | 5/2011 | Winstead |
| 2011/0307127 A1* | 12/2011 | Swenson ................ F02B 37/16 701/21 |
| 2012/0000448 A1* | 1/2012 | Freund .................. F02M 26/43 123/568.21 |
| 2012/0078492 A1 | 3/2012 | Freund et al. |
| 2012/0096927 A1* | 4/2012 | Freund .................. F02B 37/005 73/31.03 |
| 2012/0222659 A1* | 9/2012 | Kulkarni ............... F02M 26/43 123/568.11 |
| 2012/0260897 A1* | 10/2012 | Hayman ............... F02D 41/005 123/568.2 |
| 2013/0000614 A1* | 1/2013 | Freund .................... F02D 21/08 123/568.2 |
| 2013/0030672 A1* | 1/2013 | Klingbeil ............. F02D 41/0085 701/109 |
| 2013/0042843 A1* | 2/2013 | Sano ...................... F02D 21/08 123/568.16 |
| 2013/0186376 A1* | 7/2013 | Peters .................. F02D 41/0065 123/568.2 |
| 2014/0014075 A1* | 1/2014 | Yager .................. F02D 41/0047 123/568.11 |
| 2014/0041384 A1* | 2/2014 | Mischler ............. F02D 41/0007 60/605.2 |
| 2014/0214302 A1* | 7/2014 | Parikh ................. F02D 41/0007 701/101 |
| 2014/0214304 A1* | 7/2014 | Mischler ................ F02D 41/18 701/102 |
| 2015/0013651 A1* | 1/2015 | Hayman ............... F02M 26/21 123/568.11 |
| 2015/0089940 A1* | 4/2015 | Sivasubramaniam ........................ F02B 37/004 60/602 |
| 2015/0089942 A1* | 4/2015 | Kihara ................. F02D 41/0072 60/605.2 |
| 2015/0354482 A1* | 12/2015 | Leone .................... F02M 26/05 123/568.21 |
| 2016/0069301 A1* | 3/2016 | Karunaratne .......... F02M 26/43 123/568.12 |
| 2016/0138526 A1* | 5/2016 | Peters ..................... G01L 11/04 123/559.1 |
| 2016/0369723 A1* | 12/2016 | Deb ........................ F02D 21/08 |
| 2017/0074236 A1 | 3/2017 | Hynum et al. |

FOREIGN PATENT DOCUMENTS

| | | |
|---|---|---|
| JP | 2008280884 A | 11/2008 |
| JP | 2010059922 A * | 3/2010 |
| JP | 2010059922 A | 3/2010 |
| JP | 2015017531 A * | 1/2015 |

(56) References Cited

FOREIGN PATENT DOCUMENTS

| WO | 0111217 A1 | 2/2001 | |
|---|---|---|---|
| WO | WO-2006111280 A1 * | 10/2006 | ............ F02M 26/39 |
| WO | 2007008196 A1 | 1/2007 | |

* cited by examiner

METHOD AND SYSTEMS FOR EXHAUST GAS CONTROL

CROSS REFERENCE TO RELATED APPLICATIONS

The present application is a divisional of U.S. Non-Provisional application Ser. No. 15/045,616 entitled "METHOD AND SYSTEMS FOR EXHAUST GAS CONTROL" and filed on Feb. 17, 2016. U.S. Non-Provisional application Ser. No. 15/045,616 is a continuation-in-part of U.S. Non-Provisional application Ser. No. 13/039,957, entitled "METHODS AND SYSTEMS FOR AN ENGINE", and filed on Mar. 3, 2011. The entire contents of the above-listed applications are hereby incorporated by reference for all purposes.

BACKGROUND

Technical Field

Embodiments of the subject matter disclosed herein relate to engines, engine systems, and methods for operating engine systems, for example.

Discussion of Art

Exhaust gas recirculation (EGR) lowers peak combustion temperatures and hence lowers NOx production, and thus engine systems may be configured to tightly control EGR in order to maintain emissions under designated limits. One or more exhaust gas flow control valves in the exhaust of an engine system may be adjusted in order to control the amount of EGR directed to the engine. If one or more of the exhaust gas flow control valves becomes degraded, engine operating limits may be exceeded, leading to possible engine degradation. As such, the engine may be shut down in response to an indication of degradation of the one or more exhaust gas flow control valves. However, an unanticipated engine shutdown may be burdensome and/or pose a risk of collisions with other vehicles.

BRIEF DESCRIPTION

In one embodiment, an engine system includes an engine including a first subset of cylinders and a second subset of cylinders, the first subset of cylinders coupled to a first exhaust manifold and the second subset of cylinder coupled to a second exhaust manifold, an EGR system including a first EGR valve coupling the first exhaust manifold to an exhaust system of the engine and a second EGR valve coupling the first exhaust manifold to an intake system of the engine, and a control unit. The control unit is configured to selectively adjust a position of the first EGR valve based on a target amount, and adjust a position of the second EGR valve based on the target amount and a position of the first EGR valve, responsive to a first degradation condition of the first EGR valve, adjust the position of the second EGR valve based on the target amount and based on a pressure of the first exhaust manifold, independent of the position of the first EGR valve, and responsive to a second degradation condition of the first EGR valve, adjust the position of the second EGR valve based on the target amount, independent of the pressure of the first exhaust manifold.

DETAILED DESCRIPTION

Figure 1:
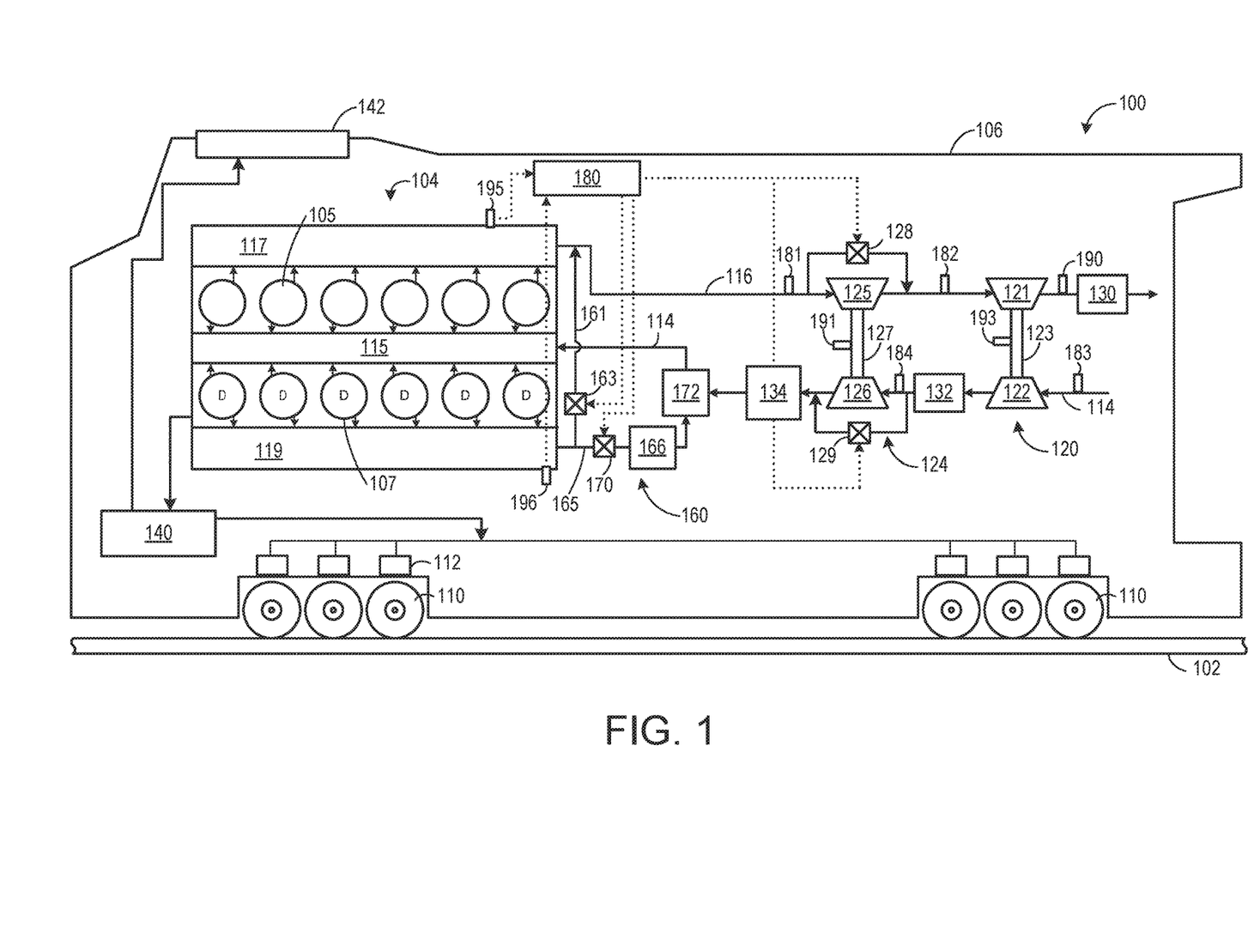
FIG. 1 shows a schematic diagram of a rail vehicle with an engine according to an embodiment of the invention.
Figure 2:
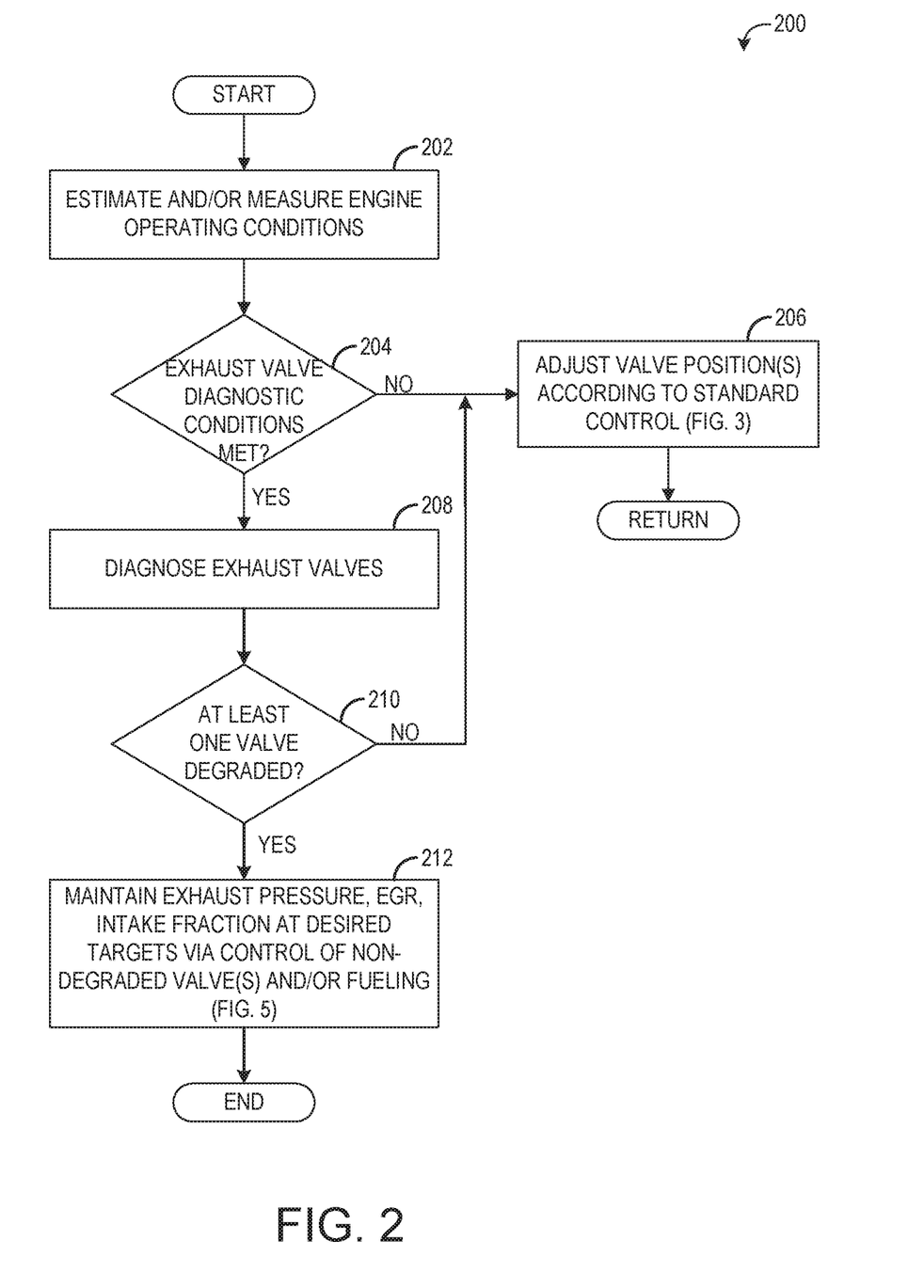
FIG. 2 is a flow chart illustrating a method for controlling exhaust gas recirculation according to an embodiment of the invention.
Figure 3:
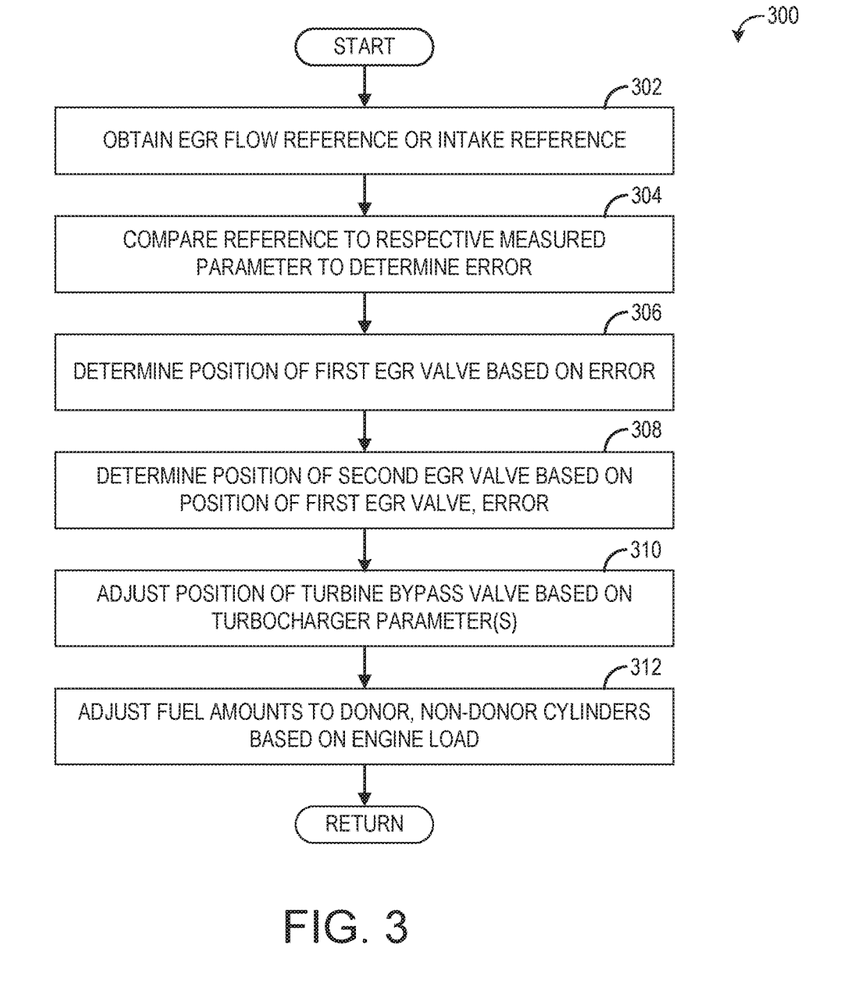
FIG. 3 is a flow chart illustrating a method for controlling exhaust valve position during non-degradation conditions according to an embodiment of the invention.

The following description relates to an engine system that may be included in a vehicle, such as the engine system of FIG. 1. The engine system includes two exhaust valves controlling flow of exhaust gas exiting an engine, and a control unit configured to detect degradation of one or both of the valves and adjust control of the non-degraded valve(s) in response to the detecting of degradation. The exhaust valves may include a first valve controlling flow of exhaust back to the exhaust of the engine, a second exhaust valve controlling flow of exhaust back to the intake of the engine, and/or a third exhaust valve controlling flow of exhaust gas around a turbine, for example. Example routines for detecting exhaust valve degradation and adjusting control of the exhaust valves are illustrated in FIGS. 2, 3, and 5. Control diagrams that may be executed during the routines to control the exhaust valves are illustrated in FIGS. 4, 6A, 6B, 7, and 8.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for controlling one or more exhaust valves, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above. In one embodiment herein, the engine is a multi-fuel engine operating with diesel fuel and natural gas, but in other examples the engine may use various combinations of fuels other than diesel and natural gas.

The engine receives intake air for combustion from an intake, such as an intake manifold 115. The intake may be any suitable conduit or conduits through which gases flow to enter the engine. For example, the intake may include the intake manifold, an intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle. In one example, the engine is a diesel engine that combusts air and diesel fuel through compression ignition. In other non-limiting embodiments, the engine may combust fuel including gasoline, kerosene, biodiesel, natural gas, and/or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 140 and electric traction motors 112. For example, the engine is a diesel engine that generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of a plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine may include a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders. In yet another embodiment, the engine may not include any donor cylinders and instead include only non-donor cylinders, or the engine may include only donor cylinders and not any non-donor cylinders. In another embodiment, exhaust gas recirculation (EGR) may be provided from a bank of cylinders supplying a manifold with exhaust and then this exhaust may be supplied to an air intake.

As depicted in FIG. 1, the non-donor cylinders are coupled to the exhaust passage to route exhaust gas from the engine to atmosphere (after it passes through an optional exhaust gas treatment system 130 and first and second turbochargers 120 and 124). The donor cylinders, which provide engine exhaust gas recirculation (EGR), are coupled exclusively to an EGR passage 165 of an EGR system 160 which routes exhaust gas from the donor cylinders to the intake passage of the engine. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, the EGR system includes an EGR bypass passage 161 that is configured to divert exhaust from the donor cylinders back to the exhaust passage. The EGR bypass passage may be controlled via a first EGR valve 163. The first valve may be configured with a plurality of restriction points such that a variable amount of exhaust is routed to the exhaust, in order to provide a variable amount of EGR to the intake. As explained above, the donor cylinders are coupled to an EGR passage 165 that is configured to route exhaust to the intake via a second EGR valve 170. For example, when the second EGR valve 170 is open, exhaust may be routed from the donor cylinders to the EGR cooler and/or additional elements prior to being routed to the intake passage. In the embodiment shown in FIG. 1, the first EGR valve and the second EGR valve may each be engine oil, or hydraulically, actuated valves, for example, with a shuttle valve (not shown) to modulate the engine oil. In other examples, the first and second EGR valves may be pneumatic valves, electric valves, or another suitable valve.

Thus, the first EGR valve 163 is operable to route exhaust from the donor cylinders to the exhaust passage of the engine and the second EGR valve 170 is operable to route exhaust from the donor cylinders to the intake passage of the engine. As such, the first EGR valve may be referred to as an EGR bypass valve, while the second EGR valve may be referred to as an EGR metering valve. In some examples, the valves may be actuated such that one of the first and second EGR valves is normally open and the other is normally closed. Additionally, the first and second EGR valves may be controlled in tandem, such that if the first EGR valve is adjusted to restrict the corresponding bypass passage 161 by a given amount (e.g., 25%), the second EGR valve is adjusted to restrict the EGR passage 165 by a corresponding amount (e.g., 75%) to maintain an overall constant level of restriction between the two passages.

In one embodiment, when the first EGR valve is fully open and the second EGR valve is fully closed, all the exhaust produced during combustion in the donor cylinders is directed to the exhaust and eventually to atmosphere, and not directed to the intake. When the first EGR valve is fully closed and the second EGR valve is fully open, all exhaust produced during combustion in the donor cylinders is directed to the intake, and not to the exhaust. All exhaust produced by the non-donor cylinders is directed to the exhaust, regardless of a position of the first EGR valve and second EGR valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of the turbochargers in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system may further include a multi-stage turbocharger with the first turbocharger 120 and the second turbocharger 124 arranged in series, each of the turbochargers arranged between the intake passage and the exhaust passage. The multi-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "multi-stage turbocharger" may generally refer to a multi-stage turbocharger configuration that includes two or more turbochargers. For example, a multi-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In alternate embodiments, the engine system may only include a single stage turbocharger with only a single turbine and single compressor.

In the embodiment shown in FIG. 1, the second turbocharger is provided with a turbine bypass valve (TBV) 128 which allows exhaust gas to bypass the second turbocharger. The turbine bypass valve may be opened, for example, to divert the exhaust gas flow away from and around the second turbine. In this manner, the rotating speed of the second compressor, and thus the boost provided by the turbochargers to the engine may be regulated. For example, by increasing the opening of the TBV, the speed of the turbine and thus the compressor mechanically coupled with the turbine may decrease, thereby decreasing boost provided to the engine. Decreasing boost may decrease an intake manifold pressure (MAP) of the engine. The TBV may be actuated hydraulically via engine oil, for example, or may be actuated via a pneumatic actuator, electric actuator, or other suitable actuator.

Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor 126 to avoid compressor surge, for example. In some embodiments, the first turbocharger may also be provided with a compressor bypass valve, while in other embodiments, only first turbocharger may be provided with a compressor bypass valve.

The vehicle system further includes the exhaust treatment system coupled in the exhaust passage in order to reduce regulated emissions. As depicted in FIG. 1, the exhaust gas treatment system is disposed downstream of the first turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. In alternate embodiments, the vehicle system may not include the exhaust aftertreatment system.

The exhaust passage may further include an exhaust gas sensor 190. The exhaust gas sensor measures an exhaust emission value (e.g., level) of the exhaust gas. For example, the exhaust gas sensor may measure a content of the exhaust gas. In one example, the exhaust emission value may be an amount of oxygen and/or NOx in the exhaust gas. As such, the exhaust gas sensor may measure both an oxygen and NOx level of the exhaust gas flowing through the exhaust passage. In another example, the exhaust passage may include two exhaust gas sensors, a first sensor measuring exhaust oxygen content and a second sensor measuring exhaust NOx content. The exhaust gas sensor is shown positioned downstream from the turbochargers and upstream of the exhaust gas treatment system. However, in alternate embodiments the exhaust gas sensor may be positioned in alternate locations in the exhaust passage, such as upstream of the turbochargers or between the two turbocharger stages. The exhaust gas sensor may alternatively be positioned in orificed side-sample lines that bypass the one or more turbines. In one example, the exhaust gas sensor may be a universal exhaust gas oxygen sensor (UEGO) or another appropriate exhaust constituent sensor.

The vehicle system further includes the control unit 180, which is provided and configured to control various components related to the vehicle system. In one example, the control unit includes a computer control system (e.g., referred to herein as a controller). The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, sensor 184 arranged in the inlet of the high-pressure compressor, and the exhaust gas sensor. The sensors arranged in the inlets of the turbochargers may detect air temperature and/or pressure. In one example, a pressure difference across the TBV (and high pressure turbine) may be determined based on a difference between turbine inlet pressure (measured by sensor 181) and turbine outlet pressure (measured by sensor 182).

The second turbocharger may also include a speed sensor 191 for measuring turbine speed (e.g., high pressure turbine speed) of the second turbocharger and the first turbocharger may also include a speed sensor 193 for measuring turbine speed of the first turbocharger. In some embodiments, the engine may include a sensor for measuring peak cylinder pressure. Additional sensors may include, but are not limited to, engine speed, engine load, boost pressure, ambient pressure, exhaust temperature, exhaust pressure, etc. For example, a first pressure sensor 195 may measure a pressure of the non-donor exhaust manifold 117 while a second pressure sensor 196 may measure a pressure of the donor exhaust manifold 119. Correspondingly, the control unit may control the vehicle system by sending commands to various components such as traction motors, alternator, cylinder valves, throttle, heat exchangers, wastegates, EGR valves, or other valves or flow control elements, etc. For example, the controller may send commands to an actuator of a fuel injector or exhaust valve of an individual cylinder, thereby adjusting operation of the individual cylinder based on the received command.

FIG. 2 shows a flow chart illustrating a method 200 for controlling exhaust gas recirculation (EGR) in an engine system. Method 200 and all other methods described herein may be carried out by an electronic controller, such as control unit 180 of FIG. 1, according to non-transitory instructions stored in memory of the controller. Method 200 may diagnose and adjust exhaust valve position, such as EGR valves 163 and 170 and/or turbine bypass valve 128 of FIG. 1, based on various sensed or estimated parameters.

At 202, method 200 includes estimating and/or measuring engine operating conditions, which may include engine status (e.g., on or off), engine load, engine speed, transient vs. steady-state conditions, exhaust NOx concentration, and/or other suitable parameters. At 204, method 200 determines if exhaust valve diagnostic conditions are met. The exhaust valves, such as the first EGR valve controlling flow of exhaust from the donor cylinders to the exhaust, and the second EGR valve controlling flow of exhaust from the donor cylinders to the intake, may be monitored to determine if one or both of the valves is degraded. The conditions for diagnosing the exhaust valves may include an engine off period, such as a period immediately following an engine shutdown. In other embodiments, the conditions for diagnosing the exhaust valves may include engine operation at a given load, such as at idle. The conditions may further include a predetermined amount of time having elapsed since a prior diagnosis was performed. The above-described conditions for performing the exhaust valve diagnoses are exemplary, and other conditions are possible.

If it is determined at 204 that the conditions for diagnosing the exhaust valves are not met, method 200 proceeds to 206 to adjust the exhaust valve positions according to a standard control routine, which will be described in more detail below with respect to FIG. 3. Briefly, the standard control routine adjusts the positions of the first EGR valve and second EGR valve based on an EGR flow amount or intake air fraction in order to provide a desired amount of EGR to the intake to control emissions and deliver requested engine power. During the standard control routine, both of the first EGR valve and second EGR valve are adjusted in tandem to control EGR. Method 200 then returns.

If the exhaust valve diagnostic conditions are met at 204, method 200 proceeds to 208 to diagnose the exhaust valves. Diagnosing of the exhaust valves may include, for each exhaust valve, commanding that exhaust valve to one or more predetermined positions (e.g., fully open, partially open, and fully closed) and monitoring an operating parameter (e.g., valve position from a position sensor, exhaust pressure, EGR flow, etc.) indicative of the valve position to determine if the exhaust valve actually moved to the commanded position. The diagnosis for each exhaust valve may be performed individually or at the same time. Further, while in some embodiments the exhaust valve diagnosis may include diagnosis of the first EGR valve and second EGR valve, in some examples the TBV or other exhaust gas flow control valves may also be diagnosed.

At 210, method 200 includes determining if at least one exhaust valve is degraded. A degraded exhaust valve may be indicated when an exhaust valve does not move to each commanded position during the diagnosis. A degraded exhaust valve may result in the valve having a slower response rate, being leaky, not fully opening or closing, not being able to move beyond a given position, and/or being stuck in one position. A degraded valve may result from soot building up on the valve and blocking its movement, inability to send or receive signals properly (e.g., current being applied to the actuator not being received, or position sensor output not being received by the control unit), loss of actuation ability (e.g., loss of oil pressure to move the valve), or other parameter. While the compensatory control routines that are enacted herein in response to degradation (e.g., described below with respect to FIGS. 5-8) are responsive to a valve that is stuck in one position (or unable to move beyond a certain position, such as a valve that can be fully closed but cannot open by more than 15%), it is to be understood that the below-described control routine may apply to other types of valve degradation as well.

If no exhaust valves are indicated as being degraded, method 200 proceeds to 206 to adjust the valve position(s) according to the standard control routine that will be described below with respect to FIG. 3. If at 210 at least one valve is indicated as being degraded, method 200 proceeds to 212 to maintain exhaust pressure, EGR, and/or an intake fraction at desired targets via control of the non-degraded exhaust valve(s) and/or via control of fuel amounts to the engine, which will be described in more detail below with respect to FIG. 5. Briefly, when at least one valve is degraded, an EGR amount or intake fraction (e.g., intake oxygen or fresh air fraction) is maintained by adjusting another non-degraded valve, and exhaust manifold pressure may be included in the exhaust valve control scheme to prevent pressure limits from being exceeded. Additionally, where adequate control of EGR via valve position adjustment is not possible, differential fueling of the donor cylinders may help maintain intake oxygen within a desired range, thus preventing smoking or other emissions. In doing so, engine operation may be maintained, at least for a duration until service of the degraded exhaust valve may be obtained, thus avoiding an unnecessary engine shutdown. Method 200 then returns.

FIG. 3 is a flow chart illustrating a method 300 for controlling the position of one or more exhaust valves to provide desired EGR, during a non-degradation operating mode of the engine. The non-degradation operating mode may include virtually any engine operating conditions where degradation of the exhaust valves is not indicated. However, in some embodiments, the exhaust valve control of method 300 may be performed only during steady-state conditions wherein engine speed and/or load are changing by less than a threshold amount.

At 302, method 300 obtains an EGR flow reference (e.g., EGR mass flow rate, EGR percentage) or a suitable intake reference. In one example, the intake reference may be an intake oxygen fraction reference. In another example, the intake reference may be an intake fresh air fraction reference, or it may be an intake EGR fraction. While each of the above references may be used to control the exhaust valves in order to deliver a desired amount of EGR to the intake, in some conditions one or more of the references may provide more accurate EGR control than the references, and thus the selection of which reference to use to control the exhaust valve position may be based on engine operation mode (e.g., steady-state vs. transient), engine or ambient temperature (e.g., EGR flow may be more difficult to estimate or measure during cold conditions), or system configuration.

The EGR reference or intake reference may be obtained from a look-up table stored in memory of the control unit, for example, and may be based on engine load (e.g., throttle position), engine speed, and/or other suitable parameters. In one embodiment, the EGR or intake reference may be additionally or alternatively based on one or more of exhaust NOx level, engine temperature, and engine output (e.g., horsepower).

At 304, the obtained reference is compared to a respective measured parameter to determine an EGR or intake fraction error. For example, the EGR flow reference may be compared to a measured EGR mass flow. In another example, the intake oxygen fraction reference may be compared to the intake oxygen fraction of the intake manifold as measured by an intake sensor.

At 306, a position of the first EGR valve is determined based on the error. For example, the error may be used as input to a control law or other suitable feedback controller to determine a position of the first EGR valve that will provide the EGR flow or intake fraction reference. At 308, a position of the second EGR valve is determined based on the position of the first EGR valve. For example, as explained previously with respect to FIG. 1, the first EGR valve and second EGR valve may be controlled in tandem so that, between the two flow passages controlled by the valves (e.g., the EGR passage to the intake and the bypass passage to the exhaust), no net restriction is provided to the exhaust flow from the donor cylinder manifold. In other words, an amount the bypass passage is restricted by the first EGR valve (e.g., the passage is restricted by 50%) is compensated for by an amount the EGR passage is restricted (e.g., the second EGR valve may be set to a position that restricts the EGR passage by 50%). In some embodiments, the position of the second EGR valve may be further based on the error determined at 304.

At 310, a position of the TBV may be adjusted based on one or more turbocharger parameters. The turbochargers parameters may include boost pressure, exhaust pressure upstream and/or downstream of the high-pressure turbine, turbine speed, or other suitable parameters. At 312, the amount of fuel supplied to the donor cylinders and non-donor cylinders is adjusted based on engine load, exhaust air-fuel ratio, and/or other suitable parameters in order to deliver requested torque. In some examples, during the standard non-degradation operating mode of the engine, the donor cylinders may receive a different amount of fuel relative to the non-donor cylinders due to differences in exhaust backpressure between the two manifolds. However, in other examples, the donor and non-donor cylinders may receive the same amount of fuel. Further, in some embodiments, the firing of the donor cylinders may be spaced such that the firing of the donor cylinders occurs with even spacing. For example, one non-donor cylinder may be fired between every donor cylinder firing, a donor cylinder firing may be followed by two non-donor cylinder firings that are followed by another donor cylinder firing, etc. In this manner, fluctuation of the fraction of exhaust gas in the intake air over the engine cycle may be reduced thereby reducing emissions, engine noise and vibration, for example. Method 300 then returns.

Figure 4:
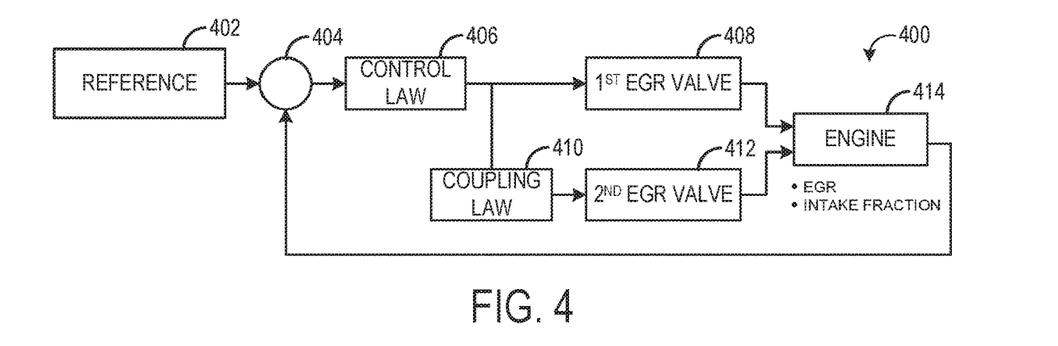
FIG. 4 is a control diagram for adjusting exhaust valve position according to an embodiment of the invention.
Figure 5:
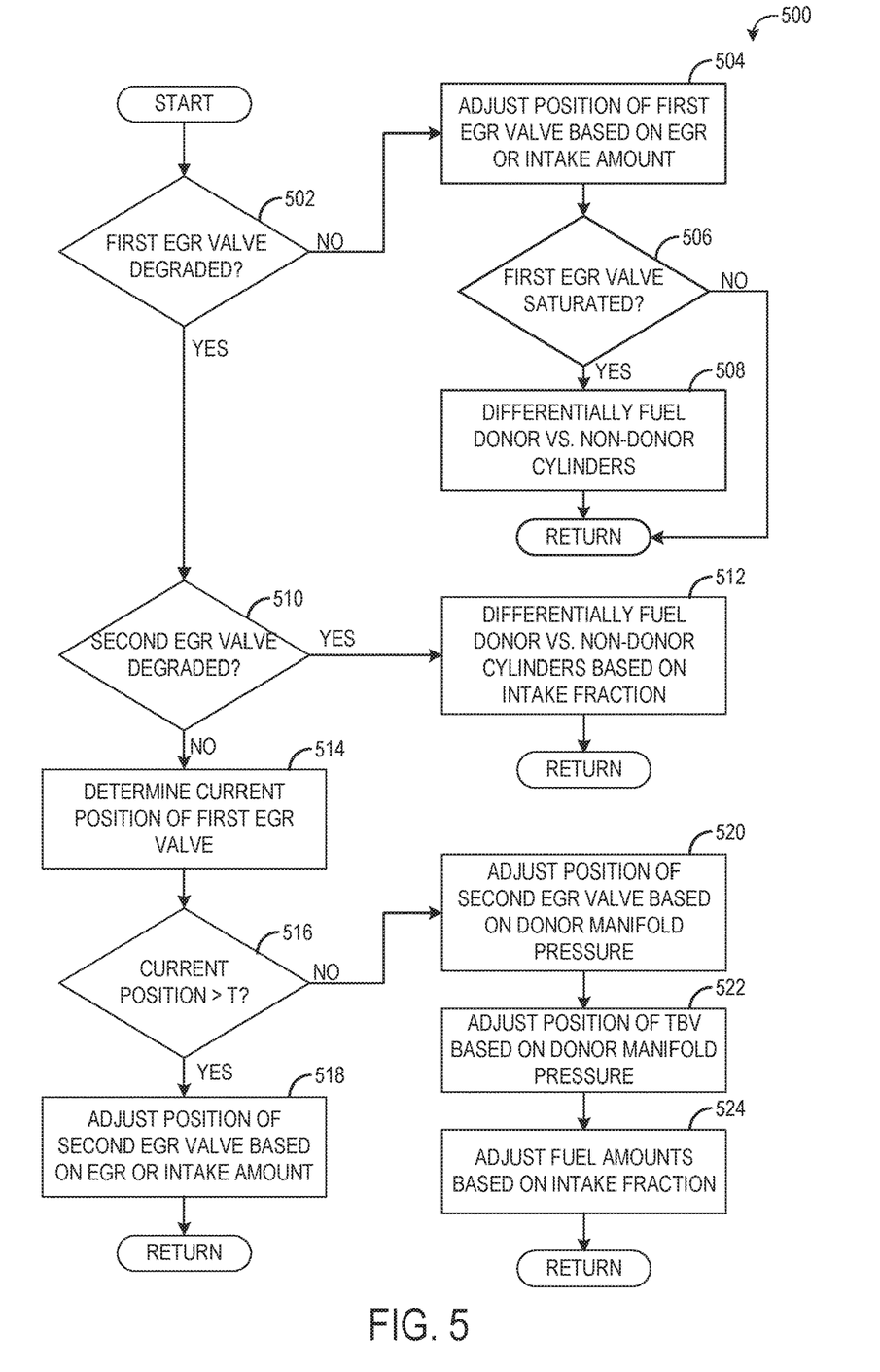
FIG. 5 is a flow chart illustrating a method for controlling exhaust valve position during degradation conditions according to an embodiment of the invention.

FIG. 4 is an example control diagram 400 showing position control of the first EGR valve and second EGR valve during execution of method 300, for example. As described above, a reference value 402 is obtained from a map, for example. The reference may be an EGR flow reference, intake oxygen or fresh air reference, or other suitable reference. The difference between the reference and a respective measured parameter (EGR flow or intake fraction) is determined at 404, and the difference is entered into a control law block 406. The control law determines a position of the first EGR valve 408, according to a suitable mechanism. For example, the control law may be a PID or other suitable controller that uses the error along with suitable gain and other parameters to output the desired position of the first EGR valve.

Additionally, the position of the first EGR valve determined by the control law is fed into the coupling law block 410 in order to determine the position of the second EGR valve 412. As explained above, the exhaust system includes two EGR valves controlled in tandem. The control law may output a single value based on the EGR flow or intake fraction error, referred to as the pseudoarea, which may represent the percentage of the EGR passage that is to be open (e.g., unrestricted) to deliver the EGR for reaching the desired fresh air fraction. However, because the flow through the EGR passage is controlled by two valves, this pseudoarea may be converted into respective effective areas for each EGR valve according to a power law function. The power law function may output an effective area value for the first EGR valve based on the pseudoarea, and then based the effective area of the first EGR valve, the coupling law may output an effective area of the second EGR valve. The effective area for each valve can then be converted to a valve percentage, then to a degree of opening, and then to an amount of current to produce that degree of opening. Other mechanisms for determining the position the second EGR valve based on the position of the first EGR valve are possible.

The adjustment to the position of the first EGR valve and the second EGR valve may affect one or more parameters of the engine 414, such as the EGR flow or intake fraction, which are measured and fed back to 404 in order to determine the error described above.

FIG. 5 is a flow chart illustrating a method 500 for controlling exhaust valve position, during a degradation operating mode of the engine. The degradation operating mode may include virtually any engine operating conditions where degradation of one or both of the EGR valves is indicated. Method 500 may switch control of EGR flow from the two EGR valves to the one, non-degraded valve, and may further adjust TBV position and/or donor cylinder fueling to maintain engine operation within pressure and emission limits.

At 502, method 500 includes determining if the first EGR valve, coupled between the donor cylinder exhaust manifold and the exhaust system, is degraded. If the first EGR valve is not degraded, it is determined that the second EGR valve, which couples the donor cylinder exhaust manifold to the intake, is degraded, and thus method 500 proceeds to 504 to adjust the position of the first EGR valve based on an EGR or intake amount (e.g., EGR flow amount, intake oxygen fraction, or fresh air fraction) in order to maintain EGR at a desired amount. In some instances, depending on the position of the degraded second EGR valve, adjustment of only the first EGR valve to reach the target EGR amount may result in the first EGR valve reaching saturation, where further control of the first EGR valve is no longer possible (e.g., the first EGR valve is fully open), yet the target EGR still has not been reached. In such cases, the amount of fuel to the donor cylinders may be controlled to maintain intake oxygen concentration at desired levels.

Accordingly, at 506, method 500 includes determining if the first EGR valve is saturated (e.g., fully open or fully closed). If the first EGR valve is not saturated, method 500 returns to continue to adjust the position of the first EGR valve based on the EGR or intake amount. If the position of the first EGR valve is saturated, method 500 proceeds to 508 to differentially fuel the donor vs. non-donor cylinders. This may include reducing the amount of fuel injected to the donor cylinders relative to the non-donor cylinders, for example by skip firing the donor cylinders or lowering fuel injection amounts to all the donor cylinders. The amount the fuel supplied to the donor cylinders is reduced may be based on the intake oxygen concentration. In this way, even if the target EGR amount or intake amount cannot be reached via control of the EGR valves, the intake oxygen fraction may be maintained above a threshold (such as 0.185). If the intake oxygen fraction drops below the threshold, emissions may increase and power may be comprised, and thus maintaining the oxygen fraction above the threshold may help maintain power and control emissions during valve degradation conditions. Method 500 then ends.

Returning to 502, if is determined that the first EGR valve is degraded, method 500 proceeds to 510 to determine if the second EGR valve is also degraded. While it is unlikely that both EGR valves may become degraded at the same time, in some circumstances both valves may experience degradation (e.g., the oil supply to both actuators may lose pressure, or another parameter that affects performance of both valves may become compromised). Thus, if both EGR valves are degraded, no control of EGR may be provided via EGR valve control. Instead, as indicated at 512, the donor cylinders may be differentially fueled relative to the non-donor cylinders, for example by reducing the amount of fuel supplied to the donor cylinders based on the intake oxygen concentration, thus increasing the oxygen fraction of the intake air. Method 500 then returns.

Returning to 510, if is determined that the second EGR valve is not degraded, that is, if it is determined that only the first EGR valve is degraded, method 500 proceeds to 514 to determine the current position of the first EGR valve (e.g., the position at which the first EGR is stuck or is unable to move from), for example based on feedback from a position sensor of the first EGR valve. At 516, method 500 determines if the current position of the first EGR valve is greater than a threshold. As used herein, the current position of the first EGR valve being greater or less than the threshold may refer to the degree of opening of the first EGR valve being greater than or less than a threshold degree of opening. In one example, the first EGR valve current position being greater than the threshold may include the current position of the first EGR valve being open by 15% or more. As explained in more detail below, based on the current position of the first EGR valve, the position of the second EGR valve may be adjusted based on either an intake amount (e.g., EGR or oxygen amount in the intake) or based on the donor manifold pressure. While the differential control strategy of the second EGR valve described below is described with respect to a single threshold (e.g., the current position of the first EGR valve being greater or less than a threshold open amount), in some examples two thresholds may be used to avoid jittering if the current position of the first EGR valve is moving around the threshold. For example, if the current position of the first EGR valve is greater than a first threshold, a first degradation control scheme (described below with respect to 518) is enacted, if the current position is less than a second threshold, a second degradation control scheme is enacted (described below with respect to 520), and if the current position is between the first and second threshold, then the existing degradation control scheme is continued.

Accordingly, if the current position is greater than the threshold, method 500 proceeds to 518 to adjust the position of the second EGR valve based on the EGR or intake amount. When the current position of the first EGR valve is greater than the threshold, enough exhaust gas is able to travel from the donor exhaust manifold to the exhaust system so that donor exhaust manifold over-pressure events will not occur, even at relatively low EGR amounts (e.g., when the second EGR valve is controlled to a position having a relatively small degree of opening), and thus all EGR control may be provided by the second EGR valve.

If the current position of the first EGR valve is not greater than the threshold, that is if the first EGR valve is stuck mostly closed (e.g., closed by 85% or more), method 500 proceeds to 520 to adjust the position of the second EGR valve based on donor exhaust manifold pressure. For example, in response to degradation of the first EGR valve, the control unit may obtain the output from the donor manifold pressure sensor (e.g., sensor 196 of FIG. 1) and adjust the position of the second EGR valve based on the output such that the donor manifold pressure does not exceed a threshold pressure, such as 7 bar. Further, in some embodiments, responsive to degradation of the first EGR valve, the position of the TBV may be adjusted based on the donor manifold pressure at 522. In doing so, the donor manifold pressure may maintained at an optimal pressure. Further still, adjusting the second EGR valve based on donor manifold pressure may lead to lower intake oxygen concentrations, due to the fact that the second EGR valve may be opened more than would be indicated based on EGR control in order to lower donor manifold exhaust pressure, and hence more exhaust may be routed to the intake than when the first EGR valve is functional. Accordingly, at 524, the fuel amounts to the donor cylinders may be adjusted based on the intake oxygen or fresh air fraction to maintain the intake oxygen fraction above a threshold. Method 500 then returns.

Thus, the method 500 described above may allow for continuing engine operation even when EGR valve degradation is detected. For operating the engine in safe conditions, EGR manifold pressure may be controlled via adjustment of the non-degraded EGR valve so that donor manifold pressure does not exceed an upper pressure limit, such as pressure in a range of 6-8 Bar. The other limitation on the engine operation is the oxygen fraction in the intake manifold which affects combustion. An intake manifold oxygen fraction below a lower limit, such as a limit in a range of 0.018-0.019 may lead to smoking and drop in engine power too as a result, and thus the fueling to the donor cylinders may be controlled responsive to degradation of the EGR valve(s). In contrast, as explained above with respect to FIG. 3, during non-degradation operating modes where no degradation of the EGR valves is detected, the first EGR valve may be adjusted based on a target EGR amount or target intake amount, and not based on donor manifold pressure. Likewise, the second EGR valve may be adjusted based on the position of the first EGR valve and/or the target EGR or intake amount, and not based on the donor manifold pressure. Further, when the first EGR valve is degraded, once it is determined that the first EGR valve is stuck at less than a threshold position, the second EGR valve is adjusted based on the donor manifold pressure, and this adjustment is independent of the first EGR valve position.

Degradation of the first EGR valve (coupling the donor cylinders to the exhaust) may be detrimental if the first EGR valve degrades at an opening of <15% and further when engine load is high (e.g., notch N6 or higher). At these conditions, the alternate control strategy as described above will not only prevent engine shutdown due to excess EGR manifold pressures but also try to achieve optimum performance by controlling intake manifold oxygen fraction with differential fueling. At lower load, even though the EGR manifold pressure limits may not be exceeded even when the first EGR valve is degraded, it might still be beneficial to operate at higher second EGR valve openings and control EGR with differential fueling, in order to reduce pumping losses.

Figure 6A:
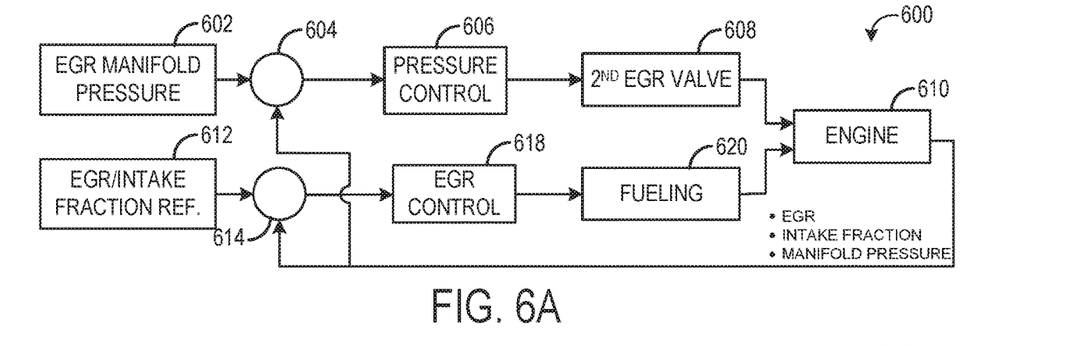
FIGS. 6A, 6B, 7 and 8 are control diagrams for adjusting exhaust valve positions according to embodiments of the invention.

FIG. 6A is an example control diagram 600 showing position control of the second EGR valve during execution of a portion of the method 500, for example. Specifically, control diagram 600 may be provide position control of the second EGR valve during a degradation operating mode where the first EGR valve is degraded and is open by less than the threshold amount (e.g., open by less than 15%) and/or engine load is above a threshold.

As described above, a donor (EGR) manifold pressure reference value 602 is obtained. In one example, the reference pressure may the pressure limit of the donor manifold (e.g., 7 bar). The difference between the reference and the measured donor manifold pressure is determined at 604, and the difference is entered into a pressure control block 606. The pressure control determines a position of the second EGR valve 608, according to a suitable mechanism. For example, the control law may be a PID or other suitable controller that uses the error along with suitable gain and other parameters to output the desired position of the second EGR valve.

Additionally, an EGR or intake fraction reference is obtained at 612, for example from a map. The reference value is compared a respective measured EGR or intake fraction amount and the difference (e.g., error) is input into an EGR control block 618 that determines differential fueling 620 for the donor cylinders. The adjustment to the position of the second EGR valve and the differential fueling may affect one or more parameters of the engine 610, such as the EGR flow, donor manifold pressure, or intake fraction, which are measured and fed back to 604 and 614 in order to determine the errors described above.

Figure 6B:
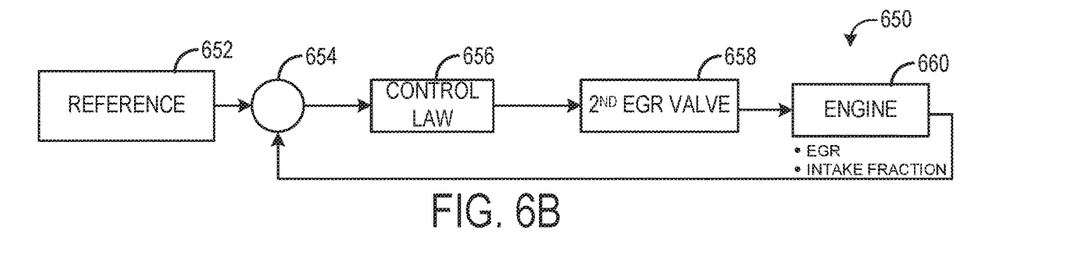

FIG. 6B is an example control diagram 650 showing position control of the second EGR valve during execution of a portion of the method 500, for example. Specifically, control diagram 650 may be provide position control of the second EGR valve during a degradation operating mode where the first EGR valve is degraded and is open by more than the threshold amount (e.g., open by more than 15%) and/or engine load is below a threshold.

A reference value 652 is obtained. The reference may be an EGR flow reference, intake oxygen, or fresh air fraction reference, and may be based on engine load, engine speed, and/or other parameters. The difference between the reference and a respective measured parameter is determined at 654, and the difference is entered into a control law block 656. The control law determines a position of the second EGR valve 658 based on the EGR flow or intake fraction error, according to a suitable mechanism. For example, the control law may be a PID or other suitable controller that uses the error along with suitable gain and other parameters to output the desired position of the second EGR valve. The adjustment to the position of the second EGR valve may affect one or more parameters of the engine 660, such as the EGR flow or intake fraction, which are measured and fed back to 654 in order to determine the errors described above.

Figure 7:
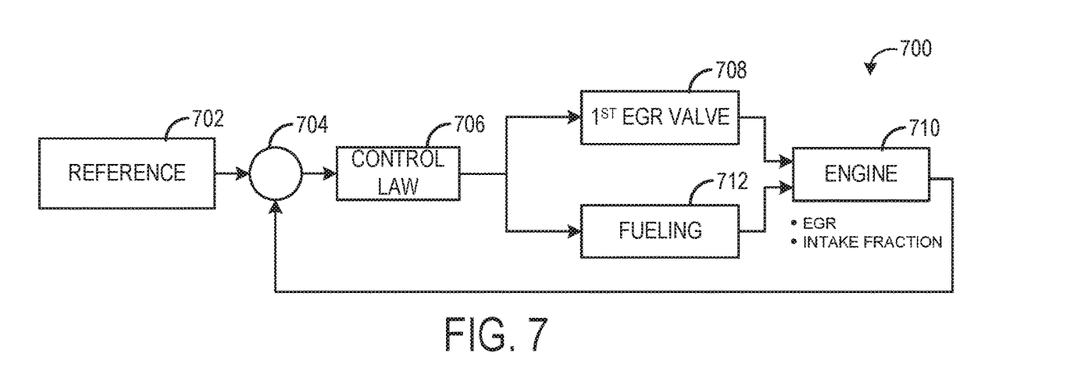

FIG. 7 is an example control diagram 700 showing position control of the first EGR valve during execution of a portion of the method 500, for example. Specifically, control diagram 700 may be provide position control of the first EGR valve during a degradation operating mode where the second EGR valve is degraded.

A reference value 702 is obtained. The reference may be an EGR flow reference, intake oxygen, or fresh air fraction reference, and may be based on engine load, engine speed, and/or other parameters. The difference between the reference and a respective measured parameter is determined at 704, and the difference is entered into a control law block 706. The control law determines a position of the first EGR valve 708 based on the EGR flow or intake fraction error, according to a suitable mechanism. For example, the control law may be a PID or other suitable controller that uses the error along with suitable gain and other parameters to output the desired position of the first EGR valve. Additionally, the control law block 706 may output a differential fueling amount 712. The adjustment to the position of the first EGR valve and the differential fueling may affect one or more parameters of the engine 710, such as the EGR flow or intake fraction, which are measured and fed back to 704 in order to determine the errors described above.

Figure 8:
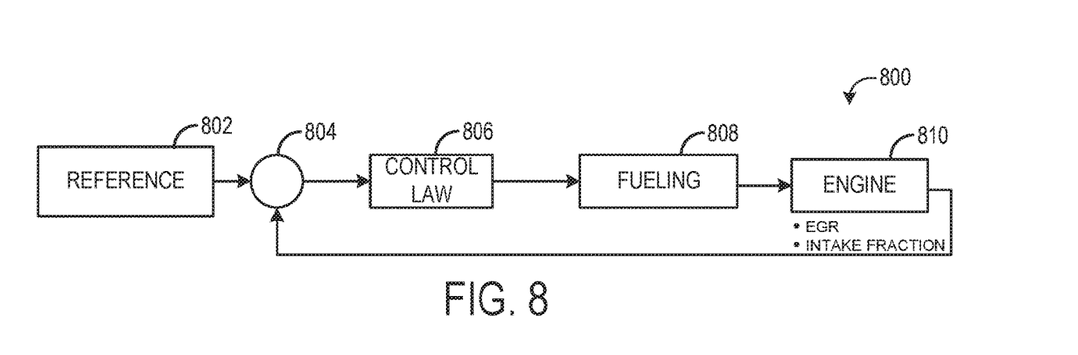

FIG. 8 is an example control diagram 800 showing fueling control during execution of a portion of the method 500, for example. Specifically, control diagram 800 may provide fueling control during a degradation operating mode where both the first EGR valve and the second EGR valve are degraded.

A reference value 802 is obtained. The reference may be an EGR flow reference, intake oxygen, or fresh air fraction reference, and may be based on engine load, engine speed, and/or other parameters. The difference between the reference and a respective measured parameter is determined at 804, and the difference is entered into a control law block 806. The control law determines a differential fueling to the donor cylinders 808 based on the EGR flow or intake fraction error, according to a suitable mechanism. For example, the control law may be a PID or other suitable controller that uses the error along with suitable gain and other parameters to output the desired differential fueling. The adjustment to the fueling may affect one or more parameters of the engine 810, such as the EGR flow or intake fraction, which are measured and fed back to 804 in order to determine the errors described above.

An embodiment relates to an engine system. The engine system includes an engine including a first subset of cylinders and a second subset of cylinders, the first subset of cylinders coupled to a first exhaust manifold and the second subset of cylinder coupled to a second exhaust manifold. The engine system also includes an exhaust gas recirculation (EGR) system including a first EGR valve coupling the first exhaust manifold to an exhaust system of the engine and a second EGR valve coupling the first exhaust manifold to an intake system of the engine. The engine system further includes a control unit configured to selectively adjust a position of the first EGR valve based on a target amount, and adjust a position of the second EGR valve based on the target amount and a position of the first EGR valve. Responsive to a first degradation condition of the first EGR valve, the control unit is configured to adjust the position of the second EGR valve based on the target amount and based on a pressure of the first exhaust manifold, independent of the position of the first EGR valve, and responsive to a second degradation condition of the first EGR valve, adjust the position of the second EGR valve based on the target amount, independent of the pressure of the first exhaust manifold.

The first degradation condition of the first EGR valve may comprise the first EGR valve being stuck open by an amount less than a threshold, and the second degradation condition of the first EGR valve may comprise the first EGR valve being stuck open by an amount more than the threshold. The target amount may include a target EGR amount. The control unit may be further configured to, responsive to a degradation condition of the second EGR valve, adjust a position of the first EGR valve based on the target amount, and once the first EGR valve is fully open, adjust fuel injection amounts to the first subset of cylinders relative to the second subset of cylinders. The control unit may be configured to, responsive to a degradation condition of both the first EGR valve and second EGR valve, adjust fuel injection amounts to the first subset of cylinders relative to the second subset of cylinders based on a target intake oxygen fraction.

An embodiment of a method for an engine system includes, during a first condition, adjusting a position of a first exhaust valve based on a target amount, and adjusting a position of a second exhaust valve based on a position of the first exhaust valve; and responsive to a second condition, adjusting the position of the second exhaust valve based on the target amount and based on exhaust manifold pressure.

During the first condition, the position of the second exhaust valve may be further adjusted based on the target amount, and the adjusting of the position of the first exhaust valve and the adjusting of the position of second exhaust valve during the first condition may be independent of the exhaust manifold pressure. The adjusting of the position of the second exhaust valve during the second condition may be independent of a position of the first exhaust valve. The first condition may comprise steady state engine operation with no degradation of the first EGR valve or second EGR valve, and the second condition may comprise an indication of degradation of the first exhaust valve. In an embodiment, the second condition further comprises engine load above a threshold load. The method may further comprise, during the first condition, adjusting a third exhaust valve based on one or more turbocharger parameters, and responsive to the second condition, adjusting the third exhaust valve based on the target amount and based on the exhaust manifold pressure. The target amount may be a target exhaust gas recirculation amount, and the method may further comprise, responsive to the second condition, maintaining a target intake oxygen amount by adjusting fueling to a subset of cylinders of an engine.

An embodiment of a system includes an exhaust gas recirculation (EGR) system including a first EGR valve and a second EGR valve; and a control unit configured to, responsive to degradation of one or more of the first EGR valve or second EGR valve, maintain exhaust manifold pressure below a threshold pressure while intake manifold oxygen concentration is maintained above a threshold concentration by one or more of adjusting a position of a non-degraded EGR valve or differentially fueling one or more cylinders of an engine.

The control unit may be configured to, when neither the first EGR valve nor the second EGR valve is indicated as being degraded, adjust a position of the first EGR valve based on a target EGR amount, and adjust a position of the second EGR valve based on the target EGR amount and a position of the first EGR valve. The control unit may be configured to, when only the first EGR valve is indicated as being degraded, determine a current position of the first EGR valve; when the current position of the first EGR valve is open by less than a threshold amount, adjust a position of the second EGR valve based on exhaust manifold pressure to maintain exhaust manifold pressure below the threshold pressure and adjust fuel injection amounts to one or more cylinders of the engine based on a target intake oxygen fraction to maintain intake manifold oxygen concentration above the threshold concentration; and when the current position of the first EGR valve is open by more than the threshold amount, adjust the position of the second EGR valve based on a target EGR amount to maintain intake manifold oxygen concentration above the threshold concentration.

The control unit may be configured to, when only the second EGR valve is indicated as being degraded, adjust a position of the first EGR valve based on a target EGR amount, and once the first EGR valve is saturated, adjust fuel injection amounts to one or more cylinders of the engine based on the target EGR amount to maintain intake manifold oxygen concentration above the threshold concentration. The control unit may be configured to, when both the first EGR valve and second EGR valve are indicated as being degraded, adjust fuel injection amounts to one or more cylinders of the engine based on a target intake oxygen fraction to maintain intake manifold oxygen concentration above the threshold concentration. The system may further comprise a turbocharger coupled to the engine, flow through a turbine of the turbocharger controlled by a turbine bypass valve, and the control unit may be configured to adjust a position of the turbine bypass valve responsive to degradation of one or more of the first EGR valve or second EGR valve. The engine may include a first subset of cylinders and a second subset of cylinders, the first EGR valve may couple the first subset of cylinders to an exhaust system of the engine, the second EGR valve may couple the first subset of cylinders to an intake system of the engine, and the exhaust manifold pressure may be an exhaust manifold pressure of an exhaust manifold coupled to the first subset of cylinders, and differentially fueling one or more cylinders of the engine may comprise differentially fueling the first subset of cylinders relative to the second subset of cylinders. The second subset of cylinders may be coupled to a second exhaust manifold configured to supply exhaust gas only to the exhaust system, and the first subset of cylinders and second subset of cylinders may be configured to receive a mixture of intake air and exhaust gas via the intake system. The control unit may be further configured to fire each of the first subset of cylinders and second subset of cylinders according to an engine firing order, where the engine firing order includes firing at least one cylinder of the second subset of cylinders between every cylinder firing of the first subset of cylinders per engine cycle.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine system, comprising:
 operating in a first condition that includes steady state engine operation;
 while operating in the first condition, adjusting a position of a first exhaust valve based on a target amount, and adjusting a position of a second exhaust valve based on the position of the first exhaust valve;
 operating in a second condition that includes an indication of degradation of the first exhaust valve; and
 responsive to operating in the second condition, determining a difference between a reference exhaust manifold pressure and a sensed exhaust manifold pressure and adjusting the position of the second exhaust valve by a commanded amount, the commanded amount determined according to an input that includes the determined difference.

2. The method of claim 1, wherein, during the first condition, the position of the second exhaust valve is further adjusted based on the target amount, and wherein the adjusting of the position of the first exhaust valve and the adjusting of the position of the second exhaust valve during the first condition are independent of the sensed exhaust manifold pressure.

3. The method of claim 1, wherein the input is independent of a commanded position of the first exhaust valve.

4. The method of claim 1, wherein the second condition further comprises engine load above a threshold load.

5. The method of claim 1, further comprising, during the first condition, adjusting a third exhaust valve based on one or more turbocharger parameters, and, responsive to operating in the second condition, adjusting the third exhaust valve based on the target amount and based on the sensed exhaust manifold pressure.

6. The method of claim 1, wherein the target amount is a target exhaust gas recirculation amount, and further comprising, responsive to operating in the second condition, maintaining a target intake oxygen amount by adjusting fueling to a subset of cylinders of an engine.

7. An engine system, comprising:
 a first exhaust valve;
 a second exhaust valve; and
 a control unit storing non-transitory instructions stored in memory executable to:
  during a first condition, adjust a determine a first target position of the first exhaust valve by entering a difference between a target amount and a reference amount to a control law block of the control unit and adjust a determine a second target position of the second exhaust valve by entering the first target position of the first exhaust valve into a coupling law block of the control unit, and command adjustment of the first exhaust valve to the first target position and adjustment of the second exhaust valve to the second target position; and
  responsive to a second condition, determine a third target position of the second exhaust valve by entering an input to a pressure control block of the control unit, where the input includes sensed exhaust manifold pressure, and command adjustment of second exhaust valve to the third target position, where during the second condition, the second exhaust valve is adjusted to maintain the sensed exhaust manifold pressure below a threshold pressure as engine operating conditions change.

8. The engine system of claim 7, wherein, during the first condition, the instructions are further executable to determine the second position of the second exhaust valve based on the target amount, and wherein the first position of the first exhaust valve and the second position of the second exhaust valve during the first condition are determined independent of the sensed exhaust manifold pressure.

9. The engine system of claim 7, wherein the input is independent of a commanded position of the first exhaust valve.

10. The engine system of claim 7, wherein the first condition comprises steady state engine operation, and wherein the second condition comprises an indication of degradation of the first exhaust valve.

11. The engine system of claim 10, wherein the second condition further comprises engine load above a threshold load.

12. The engine system of claim 7, further comprising a third exhaust valve, and wherein the instructions are further executable to, during the first condition, adjust the third exhaust valve based on one or more turbocharger parameters, and responsive to the second condition, adjust the third exhaust valve based on the target amount and based on the sensed exhaust manifold pressure.

13. The engine system of claim 7, wherein the target amount is a target exhaust gas recirculation amount, and wherein the instructions are further executable to, responsive to the second condition, maintain a target intake oxygen amount by adjusting fueling to a subset of cylinders of an engine.

\* \* \* \* \*